US012731863B2

(12) United States Patent
Mita

(10) Patent No.: US 12,731,863 B2
(45) Date of Patent: Sep. 8, 2026

(54) ELECTRODE BODY FOR SECONDARY BATTERIES

(71) Applicant: SANYO Electric Co., Ltd., Osaka (JP)

(72) Inventor: Kazutaka Mita, Hyogo (JP)

(73) Assignee: SANYO Electric Co., Ltd., Osaka (JP)

( * ) Notice: Subject to any disclaimer, the term of this patent is extended or adjusted under 35 U.S.C. 154(b) by 676 days.

(21) Appl. No.: 17/911,793

(22) PCT Filed: Feb. 8, 2021

(86) PCT No.: PCT/JP2021/004633
§ 371 (c)(1),
(2) Date: Sep. 15, 2022

(87) PCT Pub. No.: WO2021/192667
PCT Pub. Date: Sep. 30, 2021

(65) Prior Publication Data
US 2023/0118798 A1 Apr. 20, 2023

(30) Foreign Application Priority Data
Mar. 26, 2020 (JP) ................................ 2020-055900

(51) Int. Cl.
*H01M 50/538* (2021.01)
*H01M 50/46* (2021.01)

(52) U.S. Cl.
CPC ....... *H01M 50/461* (2021.01); *H01M 50/538* (2021.01)

(58) Field of Classification Search
CPC ............ H01M 50/461; H01M 50/538; H01M 50/209; H01M 50/449; H01M 50/434;
(Continued)

(56) References Cited

U.S. PATENT DOCUMENTS 4,788,113 A * 11/1988 Bohle ................ H01M 50/466 429/147
11,545,721 B2 * 1/2023 Ogawa ............. H01M 10/0587
(Continued)

FOREIGN PATENT DOCUMENTS

CN 104040757 A 9/2014
CN 106299444 A 1/2017
(Continued)

OTHER PUBLICATIONS

International Search Report dated Apr. 13, 2021, issued in counterpart Application No. PCT/JP2021/004633, with English translation. (5 pages).

(Continued)

*Primary Examiner* — Dah-Wei D. Yuan
*Assistant Examiner* — Pin Jan Wang
(74) *Attorney, Agent, or Firm* — WHDA, LLP

(57) ABSTRACT

This electrode body for secondary batteries comprises: a positive electrode; a negative electrode; an outer separator; and an inner separator which is arranged inside the outer separator. An outer electrode, which is either the positive electrode or the negative electrode arranged on the outer side, is sandwiched by the outer separator and the inner separator. The outer separator and the inner separator have: two electrode facing parts that face the outermost layers of the outer electrode, while overlapping with each other, with the outer electrode being interposed therebetween; and a terminal overlapping part that is provided at respective ends of the outer separator and the inner separator. The thickness of the front end of the terminal overlapping part is larger than the sum of the thicknesses of the two electrode facing parts.

7 Claims, 3 Drawing Sheets

(58) Field of Classification Search
CPC ............. H01M 50/446; H01M 50/426; H01M 10/052; H01M 10/0431; H01M 10/0587; H01M 50/463; H01M 50/403; H01M 50/406; H01M 50/46; H01M 50/466; Y02E 60/10; Y02P 70/50
See application file for complete search history.

(56) References Cited

U.S. PATENT DOCUMENTS

2002/0124949 A1* 9/2002 Fukuda ............ B29C 66/81457 156/515
2009/0297929 A1* 12/2009 Uchida ............ H01M 10/0431 429/94
2015/0162588 A1* 6/2015 Lee .................... H01M 50/454 156/50
2015/0295216 A1* 10/2015 Okuno ................... H02J 7/865 320/128
2016/0380299 A1* 12/2016 Umeyama ......... H01M 10/0431 429/94
2017/0162913 A1* 6/2017 Ohashi ............. H01M 10/0431
2020/0303708 A1 9/2020 Ogawa et al.
2022/0158305 A1* 5/2022 Parasuraman ...... H01M 50/417

FOREIGN PATENT DOCUMENTS

JP 2005-129366 A 5/2005
JP 2009-289570 A 12/2009
JP 2011175749 A * 9/2011
JP 2017-59326 A 3/2017
JP 2017059326 A * 3/2017
JP 2017-69059 A 4/2017
JP 2017069059 A * 4/2017
WO 2013/108510 A1 7/2013
WO 2019/123835 A1 6/2019

OTHER PUBLICATIONS

Written Opinion dated Apr. 13, 2021, issued in counterpart Application No. PCT/JP2021/004633. (4 pages).
Office Action dated Nov. 5, 2025, issued in counterpart CN application No. 202180021948.3, with partial English translation. (10 pages).

* cited by examiner

ELECTRODE BODY FOR SECONDARY BATTERIES

CROSS-REFERENCE TO RELATED APPLICATION

This application is a National Phase Application filed under 35 U.S.C. § 371 of International Application No. PCT/JP2021/004633 filed on Feb. 8, 2021 which claims the benefit of priorities under 35 U.S.C. § 119 (a) of Japanese Patent Application No. 2020-055900 filed in Japan on Mar. 26, 2020, the contents of which are incorporated herein by reference.

TECHNICAL FIELD

The present disclosure relates to an electrode assembly for a secondary battery.

BACKGROUND ART

In order to improve, in a high-capacity secondary battery, packing efficiency, yield cycle time and quality of an electrode assembly including a positive electrode, a negative electrode and a separator, it is considered to use as the separator one in which at least one surface is coated with an adhesive resin having a higher melting point than its base material.

PATENT LITERATURE 1 discloses that in an electrode assembly for a secondary battery, one of the positive electrode and the negative electrode is sandwiched by two separators and a joint part is formed by laminating end portions of the two separators on a finishing side of winding thereof to join them by heat fusion. Thereby, it argues, the termination portions of the separators can be prevented from bending which causes contact between the positive and negative electrodes.

CITATION LIST

Patent Literature

PATENT LITERATURE 1: Japanese Unexamined Patent Application Publication No. 2005-129366

SUMMARY

Even in the case of forming the joint part by laminating the end portions of the two separators, followed by heat fusion of them, as in the configuration disclosed in PATENT LITERATURE 1, there is a possibility that only the corner parts of the end portions including the joint part are bent inward or in another direction to be laminated on another portion of the electrode assembly. In such a case, since this causes unevenness in stress on the electrode assembly in the case where pressure is exerted thereon from the outside due to local increase in the thickness of a part of the electrode assembly, there is room for improvement in view of enhancing performance and durability.

There is provided an electrode assembly for a secondary battery as an aspect of the present disclosure, including: a positive electrode; a negative electrode; an outer separator having, on at least one surface, a functional layer having an adhesive resin with a higher melting point than that of a separator base material; and an inner separator arranged inward of the outer separator, an outer electrode, which being either the positive electrode or the negative electrode and being arranged on an outer side, being sandwiched by the outer separator and the inner separator, wherein the outer separator and the inner separator have two electrode facing parts which face an outermost layer of the outer electrode and overlap via the outer electrode, and an end portion overlapping part provided at end portions of the outer separator and the inner separator, and a thickness of the end portion overlapping part is larger than a sum of thicknesses of the two electrode facing parts.

According to the electrode assembly for a secondary battery according to the present disclosure, the separators may be prevented from bending only at corner parts of their end portions on the occasion of overlapping such as the occasion when the separators are wound into the electrode assembly.

DESCRIPTION OF EMBODIMENTS

Hereafter, an electrode assembly for a secondary battery which is an example of an embodiment will be described in detail. Specific dimensions, ratios and the like should be determined in consideration of the following description. In the present specification, exemplified by "substantially identical", the expression "substantially . . . " is intended to be recognized as being substantially identical as well as being completely identical. Moreover, the term "end portion" is intended to mean the end and its vicinity of an object. Moreover, shapes, materials, numbers, numerical values and the like described below are exemplary illustrations for the description, and can be modified in accordance with the specifications of the electrode assembly for a secondary battery. The description be made below with the similar structures and components given the same signs.

A secondary battery configured to include an electrode assembly for a secondary battery described below is a rectangular secondary battery used for a driving power supply, for example, of an electric vehicle or a hybrid vehicle, or the like.

Figure 1:
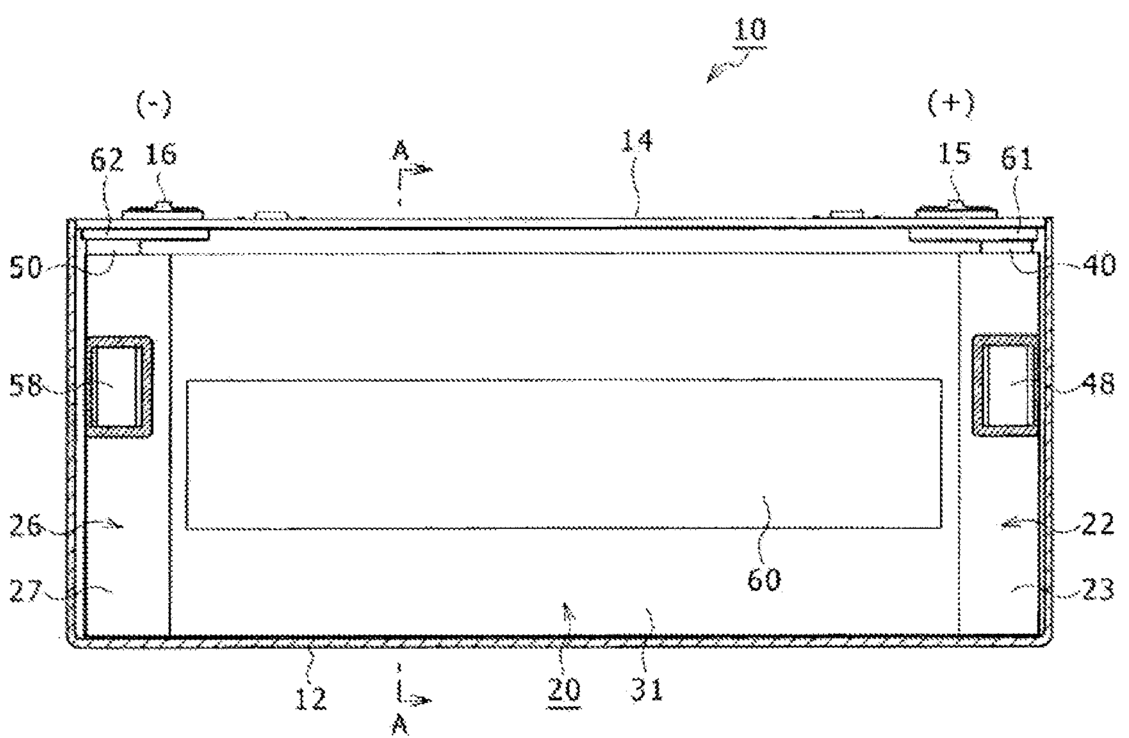
FIG. 1 is a view showing an exterior member as a sectional view in a non-aqueous electrolyte secondary battery in an example of an embodiment.
Figure 2:
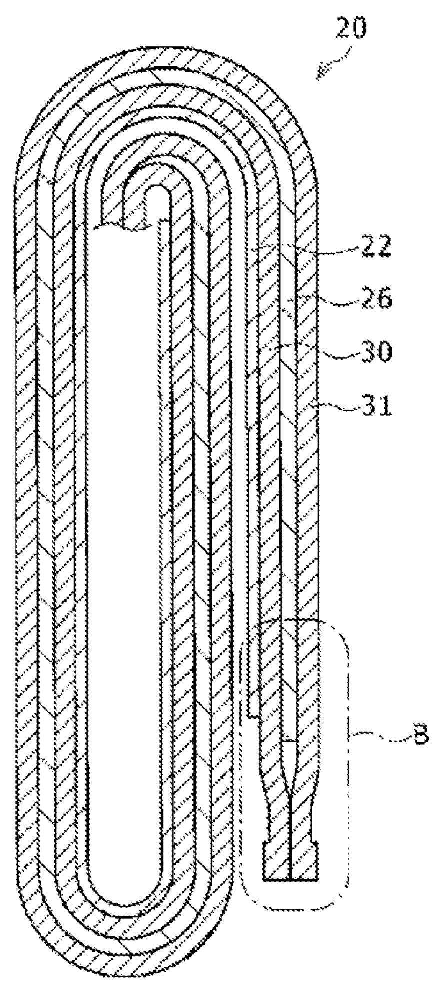
FIG. 2 is a sectional view taken along A-A in an electrode assembly for a secondary battery in FIG. 1.
Figure 3:
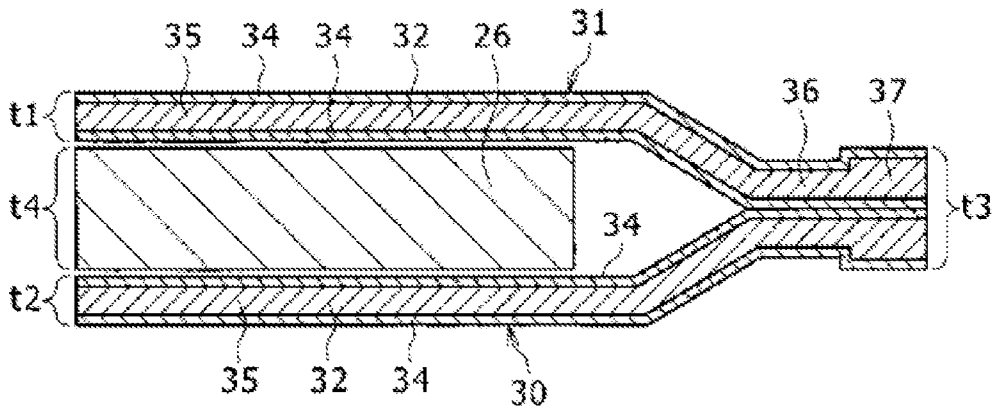
FIG. 3 is an expanded view of the portion B in FIG. 2.

Hereafter, a secondary battery which is an example of an embodiment will be described using FIG. 1 to FIG. 3. While there is described below a case where a secondary battery 10 is a non-aqueous electrolyte secondary battery, a secondary battery of the present disclosure can be applied to other secondary batteries. FIG. 1 is a view showing an exterior member 12 as a sectional view in the secondary battery 10. FIG. 2 is a sectional view taken along A-A in an electrode assembly 20 for a secondary battery in FIG. 1. FIG. 3 is an expanded view of the portion B in FIG. 2. In the description for FIG. 1, the description is made regarding the side of a sealing plate 14 of the exterior member 12 as being on the upside and the opposite side to the sealing plate 14 as being on the downside for convenience' sake.

The secondary battery 10 comprises the exterior member 12 as a casing, and the electrode assembly 20 for a secondary battery arranged inside the exterior member 12. Hereafter, the electrode assembly 20 for a secondary battery is expressed as the electrode assembly 20. There is contained inside the exterior member 12 a non-aqueous electrolyte solution corresponding to the non-aqueous electrolyte. The non-aqueous electrolyte solution is an electrolytic solution containing a lithium salt, for example, and has lithium ion conductivity.

As shown in FIG. 2, the electrode assembly 20 is a flat winding electrode assembly having a winding structure having a positive electrode 22 and a negative electrode 26 wound via separators 30 and 31, its winding axis extending in the longitudinal direction of the secondary battery 10 (the right-left direction in FIG. 1; the front-rear direction of the view plane of FIG. 2). The electrode assembly 20 is configured, for example, such that the long strip-shaped positive electrode 22, the long strip-shaped inner separator 30, the long strip-shaped negative electrode 26, and the long strip-shaped outer separator 31 are wound in the state where they are laminated and the outer separator 31 is arranged at the outermost periphery.

As shown in FIG. 1, the metal-made exterior member 12 is in a box shape having an opening at its upper end, and the secondary battery 10 comprises the sealing plate 14 closing this opening. The exterior member 12 and the sealing plate 14 can be made of aluminum or aluminum alloy. On the sealing plate 14, a positive electrode terminal 15 protrudes from one end part in the longitudinal direction (right end part in FIG. 1) and a negative electrode terminal 16 protrudes from another end part in the longitudinal direction (left end part in FIG. 1). The positive electrode terminal 15 and the negative electrode terminal 16 are fixed and attached to the sealing plate 14 via resin-made gaskets in the state of being inserted respectively into two through holes formed in the sealing plate 14. The winding axis of the electrode assembly 20 is parallel to the longitudinal direction of the sealing plate 14 (right-left direction in FIG. 1). By providing an insulating sheet folded into a box shape inside the exterior member 12, the electrode assembly 20 and the exterior member 12 may be insulated from each other.

The positive electrode 22 has positive electrode active material mixture layers, including a positive electrode active material, formed on both sides of a positive electrode current collector, for example, composed of aluminum foil. The positive electrode active material mixture layers preferably include a binder material and a conductive agent as well as the positive electrode active material. The positive electrode 22 has a positive electrode current collector exposed part 23 at its one end part in the width direction in the state before winding.

As the positive electrode active material, there can be used lithium-transition metal oxide which lithium ions can be intercalated into and desorbed from. Metal element(s) which the lithium-transition metal oxide is composed of is(are) at least one selected from cobalt (Co), nickel (Ni), manganese (Mn), magnesium (Mg), aluminum (Al), calcium (Ca), scandium (Sc), titanium (Ti), vanadium (V), chromium (Cr), iron (Fe), copper (Cu), zinc (Zn), gallium (Ga), germanium (Ge), yttrium (Y), zirconium (Zr), tin (Sn), antimony (Sb), tungsten (W), lead (Pb), and bismuth (Bi), for example. Among these, it preferably includes at least one selected from Co, Ni, Mn, and Al.

Examples of the conductive agent can include carbon materials such as carbon black, acetylene black, Ketjenblack, and graphite. One of these may be solely used or two kinds or more of these may be combined and used.

Examples of the binder material can include fluorine resins such as polytetrafluoroethylene (PTFE) and polyvinylidene fluoride (PVdF), polyacrylonitrile (PAN), polyimides, acrylic resins, polyolefins, and the like. Moreover, carboxymethylcellulose (CMC) or its salt, polyethylene oxide (PEO), and the like may be used together with these resins. One of these may be solely used or two kinds or more of these may be combined and used.

The negative electrode 26 has negative electrode active material mixture layers, including a negative electrode active material, formed on both sides of a negative electrode current collector, for example, composed of copper foil. The negative electrode active material mixture layers preferably include a binder material as well as the negative electrode active material. The negative electrode 26 has a negative electrode current collector exposed part 27 at its one end part in the width direction in the state before winding.

Examples of the negative electrode active material can include one that can reversibly store and release lithium ions, and the similar ones, and specifically, there can be used carbon materials such as natural graphite and artificial graphite, metals that are alloyed with lithium, such as silicon (Si) and tin (Sn), alloys and composite oxides including metal elements such as Si and Sn, or the like. One of these may be solely used or two kinds or more of these may be combined and used.

As with the case of the positive electrode 22, for the binder material (binder), there can be used fluorine resins, PAN, polyimides, acrylic resins, polyolefins, and the like. When mixture material slurry is prepared using an aqueous solvent, there are preferably used CMC or its salt, styrene-butadiene rubber (SBR), polyacrylic acid (PAA) or its salt, polyvinyl alcohol (PVA), and the like.

As shown in FIG. 1, in the electrode assembly 20, the wound positive electrode current collector exposed part 23 is arranged at its one end part (right end part in FIG. 1) in the winding axis direction (right-left direction in FIG. 1) which is the direction in which the winding axis extends. The wound negative electrode current collector exposed part 27 is arranged at the other end part (left end part in FIG. 1) in the winding axis direction of the electrode assembly 20.

As shown in FIG. 2, in its wound state, the inner separator 30 is arranged between the positive electrode 22 and the negative electrode 26 and electrically separates the positive electrode 22 and the negative electrode 26 from each other.

Moreover, in the electrode assembly 20, an insulating tape 60 (FIG. 1) is pasted such that the end portion, on the finishing side of winding of the outer separator 31, that is arranged at the outermost periphery causing this end portion on the finishing side of winding to be fixed onto the outer periphery of the electrode assembly 20 on one lateral surface of the electrode assembly 20 in the thickness direction.

Furthermore, a positive electrode current collector 40 is electrically connected to the wound positive electrode current collector exposed part 23. Thereby, the positive electrode current collector 40 is electrically connected to the positive electrode 22. The positive electrode current collector 40, and together, a positive electrode reception member 48 that is arranged on the opposite side of the electrode assembly 20 in the thickness direction (front side of the view plane of FIG. 1) are integrally connected with the positive electrode current collector exposed part 23 sandwiched by them. The positive electrode current collector 40 is electrically connected to the lower end part of the positive electrode terminal 15 penetrating, in the up-down direction, a first insulating member 61 arranged on the inner surface of the sealing plate 14.

A negative electrode current collector 50 is electrically connected to the wound negative electrode current collector exposed part 27. Thereby, the negative electrode current collector 50 is electrically connected to the negative electrode 26. The negative electrode current collector 50, and together, a negative electrode reception member 58 that is arranged on the opposite side of the electrode assembly 20 in the thickness direction (front side of the view plane of FIG. 1) are integrally connected with the negative electrode current collector exposed part 27 sandwiched by them. The negative electrode current collector 50 is electrically connected to the lower end part of the negative electrode terminal 16 penetrating, in the up-down direction, a second insulating member 62 arranged on the inner surface of the sealing plate 14.

The opening of the exterior member 12 is closed by the sealing plate 14 being welded to the opening end part. Next, the electrode assembly 20 is described in detail using FIG. 2 and FIG. 3. The electrode assembly 20 includes the outer separator 31 and the inner separator 30 arranged inward of the outer separator 31, and the positive electrode 22 and the negative electrode 26.

There are used for the separators 30 and 31, for example, porous sheets having ion permeability and insulation ability, and the like. Specific examples of the porous sheets include a microporous thin film, woven fabric, and nonwoven fabric. The material of each separator has a multilayer structure having a separator base material 32 which has a melting point of 120 to 150° C., for example, and is a porous layer including a thermoplastic resin as a main component, that is, 50% or more of thermoplastic resin, and functional layers 34 having an adhesive resin with a higher melting point than that of the separator base material 32. Specifically, as shown in FIG. 3, each of the separators 30 and 31 is formed into a three-layer structure of the separator base material 32 and two functional layers 34 arranged on both sides thereof. The separator base material 32 is a layer having a function of allowing ions to permeate while preventing short circuit between the positive electrode 22 (FIG. 2) and the negative electrode 26.

In each of the separators 30 and 31, examples of the thermoplastic resin which the separator base material 32 is composed of preferably include olefin-based resins such as polyethylene and polypropylene, cellulose, and the like. Each separator may be a laminated body having a cellulose fiber layer and a thermoplastic resin fiber layer such as olefin-based resins. Moreover, there can be used a multilayer separator including a polyethylene layer and a polypropylene layer, and the like.

The functional layers 34 of the separators 30 and 31 are layers for giving the separators 30 and 31 a specific function, include an adhesive resin, and may have inorganic particles mixed. The adhesive resin has a higher melting point than the separator base material 32 and, for example, has a melting point of 170° C. or more. There is used as the adhesive resin, for example, one including any one of fluorine-containing resins such as polyvinylidene fluoride (PVDF) and polytetrafluoroethylene (PTFE), fluorine-containing rubber such as a vinylidene fluoride-tetrafluoroethylene copolymer and an ethylene-tetrafluoroethylene copolymer, polyimides, polyamides (in particular, aramid), and polyamidimides.

When inorganic particles are included in the functional layers 34, the inorganic particles are $Al_2O_3$ (alumina), $SiO_2$ (silica), or Al(OH)O (boehmite), for example. The melting point of the inorganic particles is higher than the melting point of the adhesive resin. The inorganic particles have shapes close to spherical shapes, or plate-like shapes, for example. By the functional layers 34 including such inorganic particles, the functional layers 34 can be given a heat resistance function, an anti-shrink function, a short circuit protection function, and the like.

For each of the functional layers 34, the mass of the adhesive resin is not specially limited as long as it is a quantity which allows the positive electrode or the negative electrode to exhibit an adhesive property. For example, when the adhesive resin and the inorganic particles are mixed, there are used the functional layers 34 preferably including the adhesive resin in 10% of mass ratio, still preferably 25% or more of the same.

The two separators 30 and 31 are arranged on both sides of the negative electrode 26, and at the finishing end portion of winding on the outer periphery side, finishing ends of winding of the two separators 30 and 31 are elongated from the finishing end of winding of the negative electrode 26, the two separators 30 and 31 directly facing each other there. These finishing ends of winding of the two separators 30 and 31 are arranged such that their respective functional layers 34 face each other, and in this state, the two separators 30 and 31 are joined together. Accordingly, the negative electrode 26 corresponds to an outer electrode, which being either the positive electrode 22 or the negative electrode 26 and being arranged on the outer side, and is sandwiched by the two separators 30 and 31.

The outer separator 31 and the inner separator 30 have the two electrode facing parts 35 which face the outermost layer of the negative electrode 26 and overlap via the negative electrode 26, and the end portion overlapping part 36 provided at the finishing ends of winding of the outer separator 31 and the inner separator 30. The thickness of each of the separators 30 and 31 at a tip part 37 of the end portion overlapping part 36 is larger than the thickness of another portion of each of the separators 30 and 31. Accordingly, a thickness t3 of the tip part 37 of the end portion overlapping part 36 is larger than the sum (t1+t2) of thicknesses t1 and t2 of the electrode facing parts 35, of the separators 30 and 31, which are the two electrode facing parts 35 (t3>(t1+t2)). Therefore, as mentioned later, the separators 30 and 31 can be prevented from bending only at corner parts of their end portions on the occasion of overlapping such as the occasion when the separators 30 and 31 are wound into the electrode assembly 20.

Furthermore, the thickness t3 of the tip part 37 of the end portion overlapping part 36 is smaller than the sum (t1+t2+t4) of a thickness t4 of the negative electrode 26 and the thicknesses t1 and t2 of the electrode facing parts 35 of the separators 30 and 31 (t3<(t1+t2+t4)). Accordingly, the thickness of the tip part 37 of the end portion overlapping part 36 can be enlarged while preventing the thickness of the electrode assembly 20 from being partly enlarged due to the tip part 37 of the end portion overlapping part 36.

When the electrode assembly 20 of the embodiment is manufactured, the electrode assembly 20 is formed by laminating the positive electrode 22 (FIG. 2), the inner separator 30, the negative electrode 26, and the outer separator 31 while drawing them out respectively from winding bodies and taking up the laminate on a winding shaft. In this stage, the positive electrode 22, the inner separator 30, the negative electrode 26, and the outer separator 31 are cut with cutting parts at the time when respective predetermined lengths of them have been taken up. Moreover, when the two separators 30 and 31 are cut, there are heated the cutting parts for cutting the two separators 30 and 31, and the heating temperature of the cutting parts are made higher than the melting point of the adhesive resin which the functional layers 34 are composed of Thereby, the adhesive resin is molten at the time of cutting to fusion bond the cut ends of the two separators 30 and 31 together. Then, by heating the cut ends of the two separators 30 and 31 to enlarge the thicknesses of the cut ends, the thickness t3 of the tip part 37 of the end portion overlapping part 36 in the two separators 30 and 31 can be made larger than the sum (t1+t2) of the thicknesses of the electrode facing parts 35 of the separators 30 and 31 (t3>(t1+t2)).

According to the aforementioned electrode assembly 20, the thickness t3 of the tip part 37 of the end portion overlapping part 36 in the outer separator 31 and the inner separator 30 is larger than the sum (t1+t2) of the thicknesses of the electrode facing parts 35 of the separators 30 and 31. This can make the rigidity of the aforementioned tip part high, and thereby, the separators 30 and 31 can be prevented from bending only at corner parts of their end portions on the occasion of overlapping such as the occasion when the separators 30 and 31 are wound into the electrode assembly 20. In particular, when the electrode assembly 20 has a winding structure as in the embodiment, since the separators 30 and 31 tend to receive stress in the direction of their bending to the inner periphery side, bending at a corner part at the finishing end portion of winding tends to occur, and by making the thickness t3 of the tip part 37 of the end portion overlapping part 3536 larger than the sum (t1+t2) of the thicknesses of the electrode facing parts 35 of the separators 30 and 31 as above, the aforementioned bending can be prevented. This makes the effect of preventing the bending significant.

Figure 4:
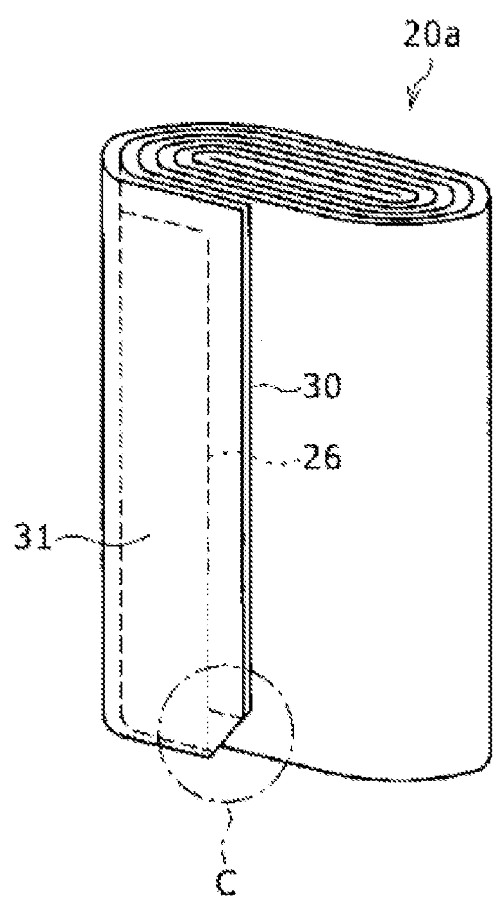
FIG. 4 is a perspective view showing a state where bending occurs on an outer separator and an inner separator in an electrode assembly for a secondary battery of a comparative example.

Meanwhile, FIG. 4 is a perspective view showing a state where bending occurs on the outer separator 31 and the inner separator 30 in an electrode assembly 20*a* of a comparative example. As with the configuration in FIG. 1 to FIG. 3, in the comparative example, with the negative electrode 26 sandwiched by the outer separator 31 and the inner separator 30 inward of the same, the tip parts of the two separators 30 and 31 are overlapped. Furthermore, each of the separators 30 and 31 includes the separator base material 32 and the two functional layers 34 arranged on both sides of the same as with the embodiment in FIG. 1 to FIG. 3, and the thickness t3 of the tip part of the end portion overlapping part in the two separators 30 and 31 equals to or smaller than the sum (t1+t2) of the thicknesses of the electrode facing parts of the separators 30 and 31 unlike the aforementioned embodiment. As shown in FIG. 4, since in such a comparative example, the rigidity of the end portions of the separators 30 and 31 is small, there arose, in winding the separators 30 and 31 into the electrode assembly 20, bending only at the corner parts of these end portions (at the portion enclosed by the dot and dash line C in FIG. 4). According to the embodiment in FIG. 1 to FIG. 3, such a disadvantage can be prevented.

Figure 5:
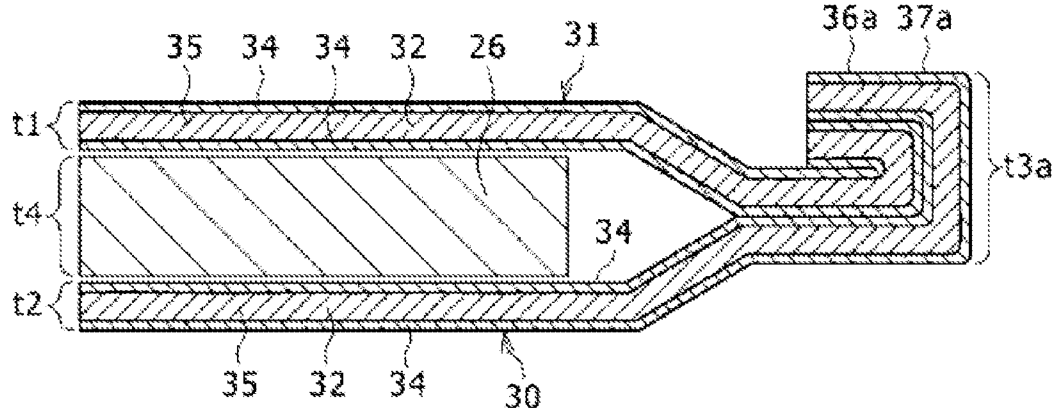
FIG. 5 is a view for an electrode assembly for a secondary battery of another example of an embodiment, the view corresponding to FIG. 3.

FIG. 5 is a view for an electrode assembly of another example of an embodiment, the view corresponding to FIG. 3. Unlike the configuration in FIG. 1 to FIG. 3, in the configuration of this example, an end portion overlapping part 36*a* provided at the end portions of the two separators 30 and 31 is formed by folding the finishing end portions of winding of the two separators 30 and 31 outward into a U shape in the state where they are laminated to laminate them further. Thereby, a thickness t3*a* of a tip part 37*a* of the end portion overlapping part 36*a* is made larger than the sum (t1+t2) of the thicknesses of the electrode facing parts 35, of the separators 30 and 31, which are the two electrode facing parts without making the thickness of the finishing end portion of winding of each of the separators 30 and 31 larger than the thickness of each electrode facing part 35 before the end portion overlapping part 36*a* is formed. As with the configuration in FIG. 1 to FIG. 3, also according to the configuration of this example, the separators 30 and 31 can be prevented from bending only at corner parts of their end portions on the occasion of overlapping such as the occasion when the separators 30 and 31 are wound into the electrode assembly 20.

As with the configuration in FIG. 1 to FIG. 3, also in the case of this example, the thickness t3*a* of the tip part 37*a* of the end portion overlapping part 36*a* is preferably smaller than the sum (t1+t2+t4) of the thickness t4 of the negative electrode 26 and the thicknesses t1 and t2 of the electrode facing parts 35 of the separators 30 and 31 (t3*a*<(t1+t2+t4)). Accordingly, the thickness of the tip part 37*a* of the end portion overlapping part 36*a* can be enlarged while preventing the thickness of the electrode assembly from being partly enlarged due to the tip part 37*a* of the end portion overlapping part 36*a*. In this example, the other components, structures and operations are similar to those of the configuration in FIG. 1 to FIG. 3.

Notably, as another example of the embodiment, the thickness of the tip part of the end portion overlapping part may be made larger than the sum of the thicknesses of the electrode facing parts of the separators by forming the separators of an ultraviolet curing resin or a thermosetting resin, and irradiating their finishing end portions of winding with ultraviolet rays or heating those.

Moreover, while there are described in the aforementioned embodiments the cases where the negative electrode 26 is the outer electrode, the thickness of the tip part of the end portion overlapping part may be made larger than the sum of the thicknesses of the electrode facing parts of the separators with a configuration in which with the positive electrode 22 being as the outer electrode, the outer separator and the inner separator sandwich the outermost layer of the positive electrode 22.

Moreover, while the aforementioned embodiments have configurations in which each of the outer separator and the inner separator has functional layers on both sides of the separator base material, each of the separators may have a configuration having a functional layer only on one side of the separator base material, in which configuration the outer separator and the inner separator are overlapped with their functional layers put inward.

While the present disclosure will be hereafter further described with examples, the present disclosure is not limited to these examples. An electrode assembly of Comparative Example 1 is also described below.

EXAMPLE 1

After mixing $LiNi_{0.5}Co_{0.2}Mn_{0.3}O_2$ as the positive electrode active material, polyvinylidene fluoride (PVdF) as the binder material, and carbon as the conductive agent in 92:4:4 of mass ratios, these were dispersed in N-methyl-2-pyrrolidone to prepare positive electrode mixture slurry. After coating aluminum foil as the positive electrode current collector with this slurry, it was dried and rolled to produce a positive electrode plate.

After mixing natural graphite as the negative electrode active material, styrene-butadiene rubber as the binder material, and carboxymethylcellulose in 96:2:2 of mass ratios, these were dispersed in water to prepare negative electrode mixture slurry. After coating copper foil as the negative electrode current collector with this slurry, it was dried and rolled to produce a negative electrode plate.

Using the positive electrode plate, the negative electrode plate, and as the separators, ones having separator base materials composed of polyethylene and layers, composed of polyvinylidene fluoride (PVDF) and $Al_2O_3$ (alumina), as functional layers on both sides of the separator base materials arranged, the separators were cut by separator cutting parts at 170° C. of temperature for the separator cutting parts to manufacture an electrode assembly of Example 1.

EXAMPLE 2

In manufacturing an electrode assembly, the separators were cut by separator cutting parts at 200° C. of temperature for the separator cutting parts. The other components and structures were similar to those of the electrode assembly of Example 1.

Comparative Example 1

In manufacturing an electrode assembly, the separators were cut by separator cutting parts at 150° C. of temperature for the separator cutting parts. The other components and structures were similar to those of the electrode assembly of Example 1.

<Thickness Measurement>

The insulating tape of the electrode assembly of Example 1 was taken apart, the electrode assembly was unwound, and there were measured two separator thicknesses at the electrode facing parts and the thickness of the tip part of the end portion overlapping part where the insulating tape was not pasted. There was used for the thickness measurement a constant pressure thickness measurement machine PG-02J produced by TECLOCK with 5 mm of probe diameter. When the thickness of the tip part of the end portion overlapping part was measured, the measurement was conducted such that the probe touched the tip part of the end portion overlapping part with about 0.5 to 1 mm. The similar measurements were performed also for Example 2 and Comparative Example 1. For each of the examples and Comparative Example 1, the number of samples was set to ten.

<Separator Bending>

There was defined the state as illustrated in FIG. 4 as separator bending.

There were collected for Examples 1 and 2 and Comparative Example 1 in Table 1 the sum (t1+t2) of the two separator thicknesses at the electrode facing parts, the separator thickness (t3) at the tip part of the end portion overlapping part, and the number of occurrences of separator bending. The average in separator thicknesses at the electrode facing parts in Table 1 denotes the sum (t1+t2) of the two separator thicknesses at the electrode facing parts as an average value. The average in separator thickness at the tip part in Table 1 denotes the separator thickness (t3) at the tip part of the end portion overlapping part as an average value. Separator bending can be evaluated as being prevented more as the number of occurrences of separator bending is smaller.

TABLE 1

| | Example 1 | Example 2 | Comparative Example 1 |
|---|---|---|---|
| Number of Occurrences of Separator Bending/Number of Samples | 3/10 | 2/10 | 7/10 |
| Average in Separator Thicknesses (t1 + t2) at Electrode Facing Parts/Average in Separator Thickness (t3) at Tip Part | 34 μm/48 μm | 33 μm/72 μm | 34 μm/31 μm |

As is apparent from Table 1, separator bending is significantly reduced for Examples 1 and 2. Accordingly, it can be said that separator bending is prevented with an electrode assembly in which the separator thickness at the tip part of the end portion overlapping part is larger than the sum of the two separator thicknesses at the electrode facing parts. On the other hand, there are a significant number of occurrences of separator bending for Comparative Example 1. Accordingly, there is room for improvement in Comparative Example 1 in view of preventing separator bending.

REFERENCE SIGNS LIST

- 10 secondary battery
- 12 exterior member
- 14 sealing plate
- 15 positive electrode terminal
- 16 negative electrode terminal
- 20, 20*a* electrode assembly for a secondary battery (electrode assembly)
- 22 positive electrode
- 23 positive electrode current collector exposed part
- 26 negative electrode
- 27 negative electrode current collector exposed part
- 30 inner separator
- 31 outer separator
- 32 separator base material
- 34 functional layer
- 35 electrode facing part
- 36, 36*a* end portion overlapping part
- 37, 37*a* tip part
- 40 positive electrode current collector
- 48 positive electrode reception member
- 50 negative electrode current collector
- 58 negative electrode reception member
- 60 insulating tape
- 61 first insulating member
- 62 second insulating member

The invention claimed is:

1. An electrode assembly for a secondary battery, including:

a positive electrode;

a negative electrode;

an outer separator; and an inner separator arranged inward of the outer separator, wherein each of the outer separator and the inner separator is formed into a three-layer structure of a separator base material containing a thermoplastic resin, and two functional layers arranged on both sides of the separator base material, the two functional layers containing an adhesive resin having a melting point higher than a melting point of the separator base material, wherein either one of the positive electrode or the negative electrode is an outer electrode and the other one is an inner electrode such that the outer electrode includes a circumferentially outermost portion disposed outward than a circumferentially outermost portion of the inner electrode, and the outer electrode is sandwiched by a circumferentially outermost portion of the outer separator and a circumferentially outermost portion of the inner separator, and the outer separator and the inner separator have two electrode facing parts which face the circumferentially outermost portion of the outer electrode and overlap via the outer electrode, and an end portion overlapping part provided at end portions of the outer separator and the inner separator, the end portion overlapping part in which the outer separator and the inner separator are not fold back and the functional layers respectively formed on one side of the outer separator and the inner separator are in contact with each other, a thickness of a tip part of the end portion overlapping part is larger than a sum of thicknesses of the two electrode facing parts, and a thickness of the outer separator and a thickness of the inner separator are respectively larger at the tip part of the end portion overlapping part than at the electrode facing parts, wherein, the positive electrode, the negative electrode, the outer separator and the inner separator have a winding structure in which they are wound in a state where they are laminated, and the outermost separator is an outermost layer of the winding structure.

2. The electrode assembly for the secondary battery according to claim 1, wherein the thickness of the tip part of the end portion overlapping part is smaller than a sum of a thickness of the outer electrode and the thicknesses of the two electrode facing parts.

3. The electrode assembly for the secondary battery according to claim 1, wherein the functional layer includes inorganic particles.

4. The electrode assembly for the secondary battery according to claim 1, wherein the adhesive resin includes any one of a fluorine-containing resin, fluorine-containing rubber, polyimide, polyamide, and polyamidimide.

5. The electrode assembly for the secondary battery according to claim 1, wherein a mass ratio of the adhesive resin in the functional layer is 10% or more.

6. The electrode assembly for the secondary battery according to claim 1, wherein the tip part of the end portion overlapping part extends further than an inner electrode end portion and an outer electrode end portion.

7. A method for manufacturing the electrode assembly for the secondary battery according to claim 1, wherein heating operation performed, at the time of cutting, to shape ends of the outer separator and the inner separator at the end portion overlapping part causes the thickness of cut ends being the ends of the outer separator and the inner separator at the end portion overlapping part to be enlarged.

* * * * *